US012589699B2

(12) United States Patent (10) Patent No.: US 12,589,699 B2
Ogonek et al. (45) Date of Patent: Mar. 31, 2026

(54) INTERCHANGEABLE MODULE ATTACHMENTS

(71) Applicant: GM Global Technology Operations LLC, Detroit, MI (US)

(72) Inventors: Piotr J. Ogonek, Casco Township, MI (US); Garret Joseph Wasko, Taylor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 142 days.

(21) Appl. No.: 18/409,020

(22) Filed: Jan. 10, 2024

(65) Prior Publication Data

US 2025/0222876 A1     Jul. 10, 2025

(51) Int. Cl.
B60R 11/00 (2006.01)

(52) U.S. Cl.
CPC ....... B60R 11/00 (2013.01); *B60R 2011/0078* (2013.01)

(58) Field of Classification Search
CPC ........................ B60R 11/00; B60R 2011/0078
USPC ..................................................... 248/224.61
See application file for complete search history.

(56) References Cited

U.S. PATENT DOCUMENTS

| | | | | |
|---|---|---|---|---|
| 6,659,792 B2 * | 12/2003 | Saka | .................. | H01R 13/5213 |
| | | | | 174/59 |
| 8,410,361 B2 | 4/2013 | Kita | | |
| 11,001,191 B2 * | 5/2021 | Colovic | ............... | B60P 7/0815 |
| 12,317,432 B2 * | 5/2025 | Honda | ................. | H05K 5/0204 |
| 2021/0305792 A1 | 9/2021 | Ando et al. | | |
| 2024/0179856 A1 * | 5/2024 | Honda | ................. | H05K 5/0073 |

* cited by examiner

*Primary Examiner* — Anita M King
(74) *Attorney, Agent, or Firm* — Honigman LLP; Matthew H. Szalach; Jonathan P. O'Brien

(57) ABSTRACT

An interchangeable attachment system, the system including a module and an interchangeable attachment leg. The module includes a body defined by a top surface, a bottom surface, and a perimeter wall extending around the body and from the top surface of the body to the bottom surface of the body, and an attachment mount disposed on the perimeter wall of the body. The attachment mount includes an outer face extending from the perimeter wall and a pair of rails, the pair of rails extending between the outer face and the perimeter wall. The interchangeable attachment leg includes a vertical body having one or more sidewalls defining a frame. The frame is sized to receive the attachment mount and slidably engage the pair of rails of the attachment mount.

20 Claims, 13 Drawing Sheets

INTERCHANGEABLE MODULE ATTACHMENTS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to interchangeable module attachments as incorporated into module enclosures.

Generally, attachment features for vehicle modules are either molded-in using the same material as the module case, or customized using brackets. While molded-in attachment features allow for direct mounting to a vehicle frame, the locations within a vehicle that a module can be mounted are limited and may include uneven surfaces.

SUMMARY

One aspect of the disclosure provides an interchangeable attachment system for a vehicle module including a module and an interchangeable attachment leg. The module includes a body defined by a top surface, a bottom surface, and a perimeter wall extending around the body and from the top surface of the body to the bottom surface of the body, and an attachment mount disposed on the perimeter wall of the body. The attachment mount includes an outer face extending from the perimeter wall and a pair of rails, the pair of rails extending between the outer face and the perimeter wall. The interchangeable attachment leg includes a vertical body having one or more sidewalls defining a frame. The frame is sized to receive the attachment mount and slidably engage with the pair of rails of the attachment mount.

Implementations of the disclosure may include one or more of the following optional features. In some implementations, the outer face includes a cutout. In these implementations, the vertical body may further include a catch, the catch selectively engaged with the cutout of the outer face. In some examples, the frame includes one or more tuning ribs disposed on an inner surface of the frame. In these examples, at least one of the one or more tuning ribs may engage the pair of rails of the attachment mount. Optionally, the one or more tuning ribs may engage the pair of rails of the attachment mount and the outer face of the attachment mount.

In some implementations, the one or more sidewalls of the frame include an interior sidewall and an outer sidewall. Here, the interior sidewall of the frame and the outer sidewall of the frame define a step. In these implementations, the step may engage a first segment of the outer face of the attachment mount. The interchangeable leg may further include a flange extending from the vertical body.

Another aspect of the disclosure provides a module and an interchangeable attachment leg. The module has a body defined by a top surface, a bottom surface, and a perimeter wall extending around the body and from the top surface of the body to the bottom surface of the body, and an attachment mount disposed on the perimeter wall of the body. The attachment mount includes an outer face extending from the perimeter wall and a pair of rails, the outer face including a cutout. The interchangeable attachment leg includes a vertical body having one or more sidewalls defining a frame and a catch. The frame is sized to receive the attachment mount and slidably engage with the pair of rails of the attachment mount. The catch selectively engages with the cutout of the outer face.

This aspect may include one or more of the following optional features. In some implementations, the pair of rails extend between the outer face and the perimeter wall. In these implementations, the cutout of the outer face may be disposed between the pair of rails. In some examples, the frame includes one or more tuning ribs disposed on an inner surface of the frame. In these examples, at least one of the one or more tuning ribs may engage the pair of rails of the attachment mount. Optionally, at least one of the one or more tuning ribs engages the outer face of the attachment mount. Additionally or alternatively, the one or more tuning ribs engage the pair of rails of the attachment mount and the outer face of the attachment mount.

In some implementations, the one or more sidewalls of the frame include an interior sidewall and an outer sidewall. Here, the interior sidewall of the frame and the outer sidewall of the frame define a step. In these implementations, the step may engage a first segment of the outer face of the attachment mount. Optionally, the interchangeable attachment leg further includes a flange extending from the vertical body.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
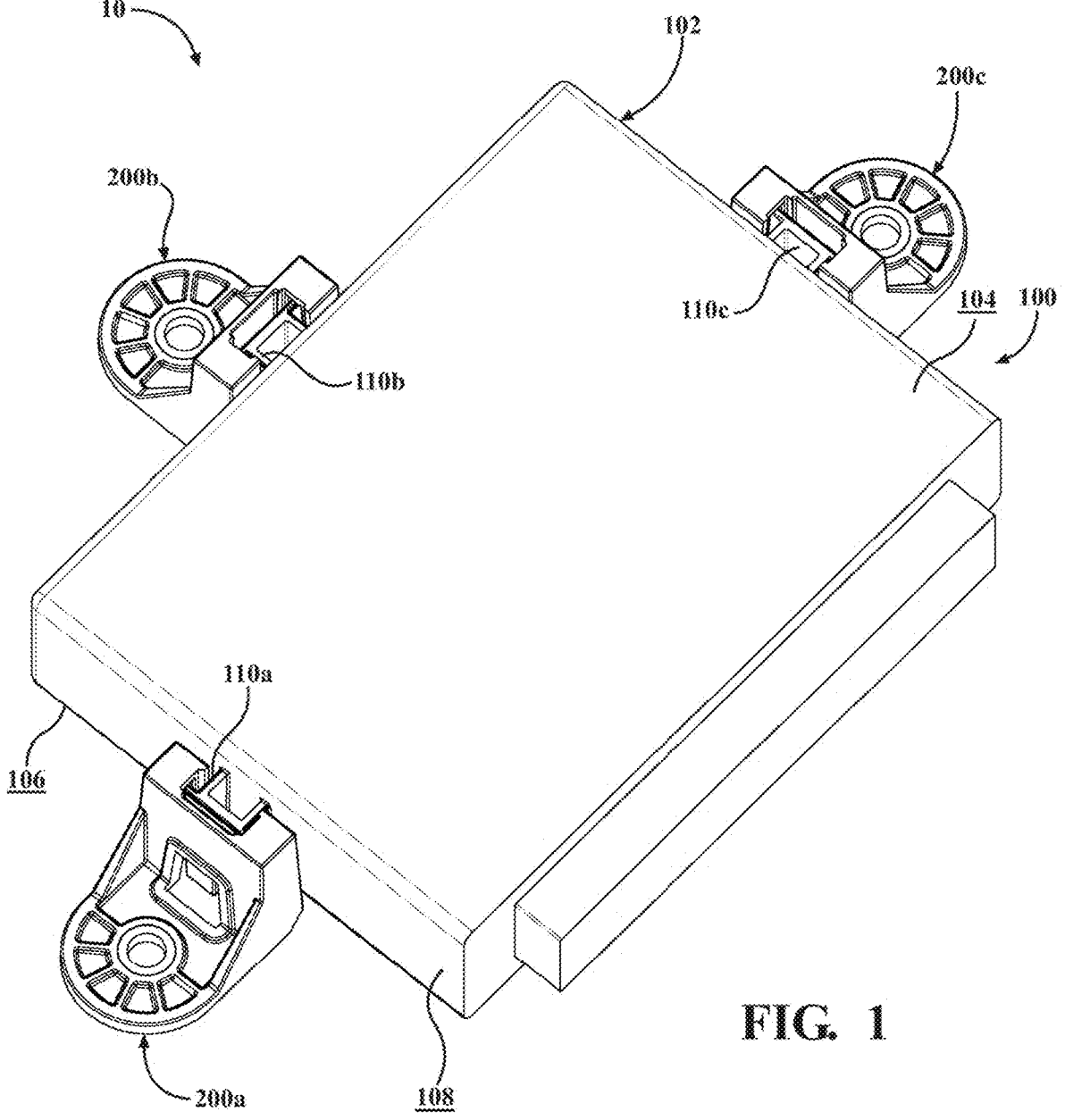
FIG. 1 is an elevation perspective view of an interchangeable module attachment system according to an example of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a." "an," and "the" may be intended to include the plural forms as well, unless the context clearly indicates otherwise. The terms "comprises." "comprising." "including." and "having." are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on." "engaged to," "connected to," "attached to," or "coupled to" another element or layer, it may be directly on, engaged, connected, attached, or coupled to the other element or layer, or intervening elements or layers may be present. In contrast, when an element is referred to as being "directly on." "directly engaged to." "directly connected to," "directly attached to," or "directly coupled to" another element or layer, there may be no intervening elements or layers present. Other words used to describe the relationship between elements should be interpreted in a like fashion (e.g., "between" versus "directly between." "adjacent" versus "directly adjacent." etc.). As used herein, the term "and/or" includes any and all combinations of one or more of the associated listed items.

The terms "first," "second." "third," etc, may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first." "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below; the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code." as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app." or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry. e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data. e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM. EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device. e.g., a CRT (cathode ray tube). LCD (liquid crystal display) monitor, or touch screen for displaying information to the user and optionally a keyboard and a pointing device. e.g., a mouse or a trackball, by which the user can provide input to the computer. Other kinds of devices can be used to provide interaction with a user as well; for example, feedback provided to the user can be any form of sensory feedback. e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Referring to FIG. 1, an attachment system or assembly 10 is generally shown. The attachment system 10 may be installed in a subfloor 12 (e.g., FIGS. 9 and 10) of a vehicle, or other suitable base surface for mounting modules. The attachment system 10 generally includes a module 100 and one or more interchangeable attachment legs 200, 200a-200c. As shown, the module 100 includes a main body 102 defined by a top surface 104, a bottom surface 106 disposed on an opposite side of the body 102 than the top surface 104, and a perimeter wall 108 extending around the main body 102 and from the top surface 104 of the main body 102 to the bottom surface 106 of the main body 102. The main body 102 further includes one or more attachment mounts 110, 110a-110c sized to receive the one or more attachment legs 200a-200c. The attachment mounts 110 may be integrally formed (i.e., molded) into the main body 102. Here, each one of the attachment legs 200 is connected to a respective attachment mount 110. In view of the substantial similarity in structure and function of the components associated with each of the attachment legs 200 and the attachment mounts 110, like reference numerals are used hereinafter and in the drawings to identify like components. Notably, the attachment mounts 110 include a lower profile than traditional molded-in attachment features and may be less prone to damage. Moreover, the streamlined profile of the attachment mounts 110 decreases the footprint of the attachment system 10 for mounting within an environment, and allows for multiple attachment legs 200 (e.g., FIGS. 8A-8C) to increase the flexibility in mounting the module 100 in multiple planes and configurations.

Figure 3A:
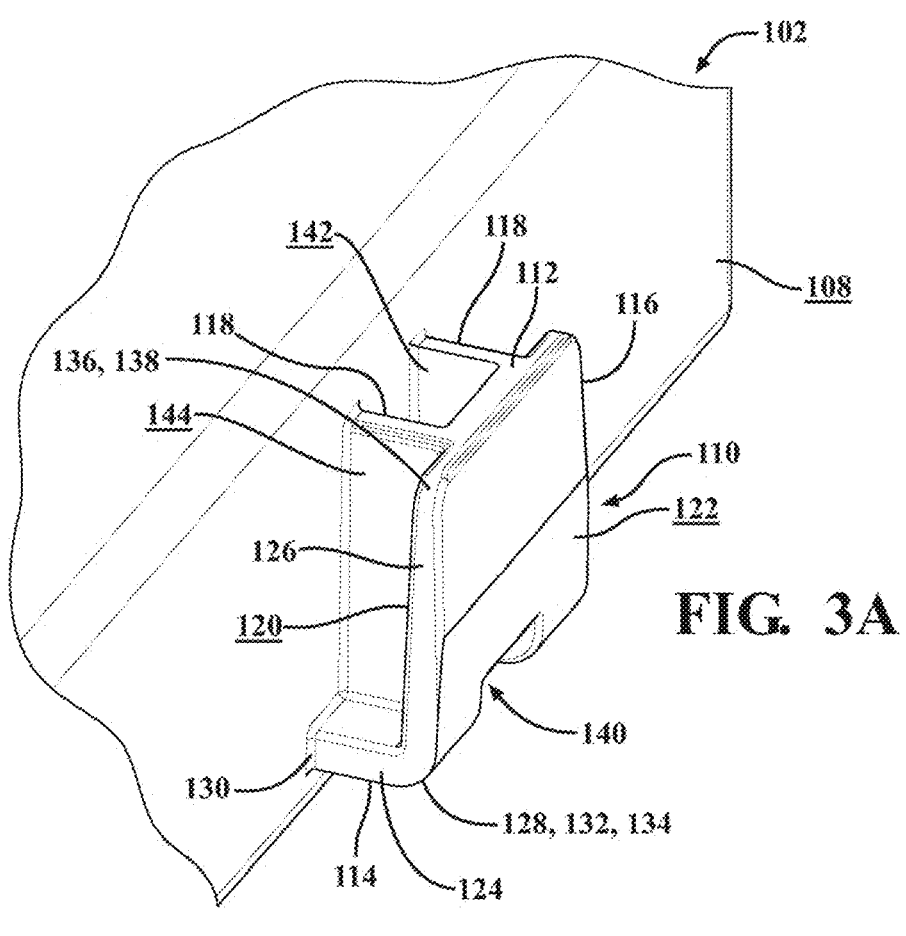
FIG. 3A is a perspective view of an attachment mount of the attachment system of FIG. 1.
Figure 3B:
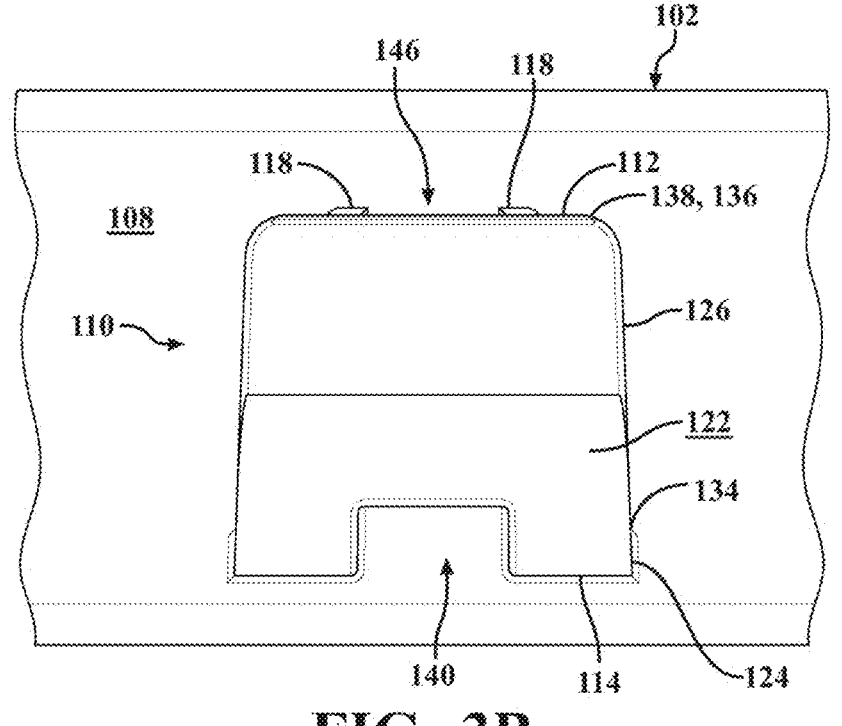
FIG. 3B is a front perspective view of the attachment mount of the attachment system of FIG. 1.
Figure 6:
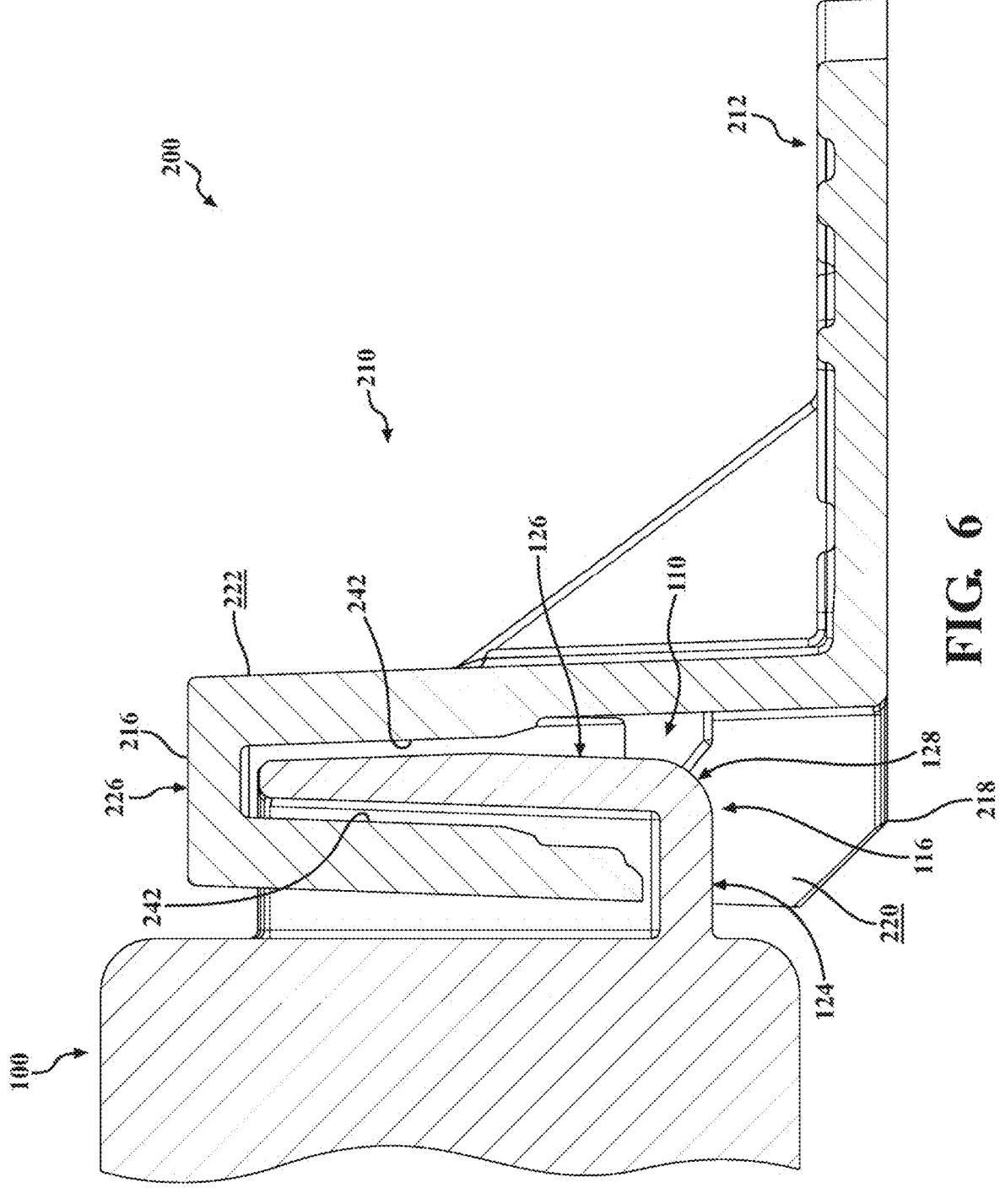
FIG. 6 is a cross-sectional view of the attachment system taken along line 6-6 of FIG. 2A.

With reference to FIGS. 3A, 3B, and 6, the attachment mount 110 extends from an open top end 112 (also referred to as a top end 112) to a closed bottom end 114 (also referred to as a bottom end 114) and includes an outer face 116 and a pair of rails 118. The outer face 116 is defined by an inner surface 120 and an outer surface 122 disposed on an opposite side of the outer face 116 than the inner surface 120 and generally forms an L-shaped bracket. The outer face 116 includes a first segment 124 and a second segment 126 connected to the first segment 124 at a bend 128. In particular, the first segment 124 extends perpendicularly from a first end 130 integrally formed with the perimeter wall 108 of the main body 102 to a second end 132 spaced away from the perimeter wall 108 of the main body 102 and at the bend 128 of the outer face 116. The second segment 126 extends perpendicularly from the first segment 124 and from a first end 134 disposed at the bend 128 to a second end 136 defining a distal end 138 of the outer face 116. A thickness between the inner surface 120 and the outer surface 122 of the second segment 126 tapers as the second segment 126 extends from the first end 134 to the second end 136. In some implementations, the thickness of the second segment 126 tapers continuously. In other implementations, the thickness of the second segment may have a varying taper as it extends from the first end 134 to the second end

7

136. With particular reference to FIG. 6, the second segment 126 of the outer face 116 extends substantially parallel to the perimeter wall 108 of the main body 102. In some implementations, the second segment 126 extends parallel to the perimeter wall 108 of the main body 102. The outer face 116 may further include a cutout 140 formed through the thickness of the second segment 126 and extending inward from the bend 128. As will be described in greater detail below, the cutout 140 is sized to selectively receive a catch 236 of the interchangeable attachment leg 200.

Figures 2A, 2B, 2C:
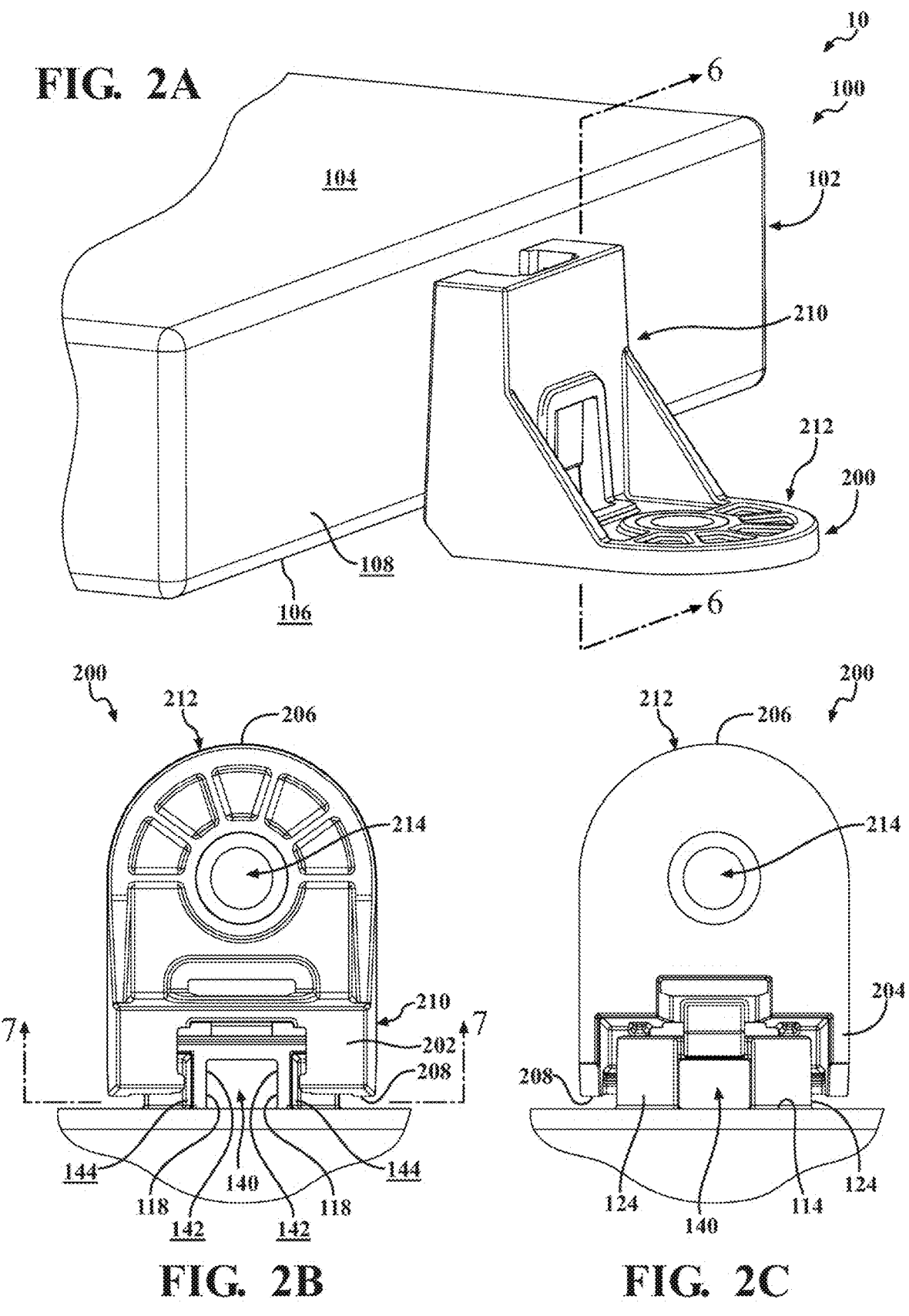
FIG. 2A is a side perspective view of the attachment system of FIG. 1.
FIG. 2B is a top plan view of the attachment system of FIG. 1.
FIG. 2C is a bottom plan view of the attachment system of FIG. 1.
Figure 7:
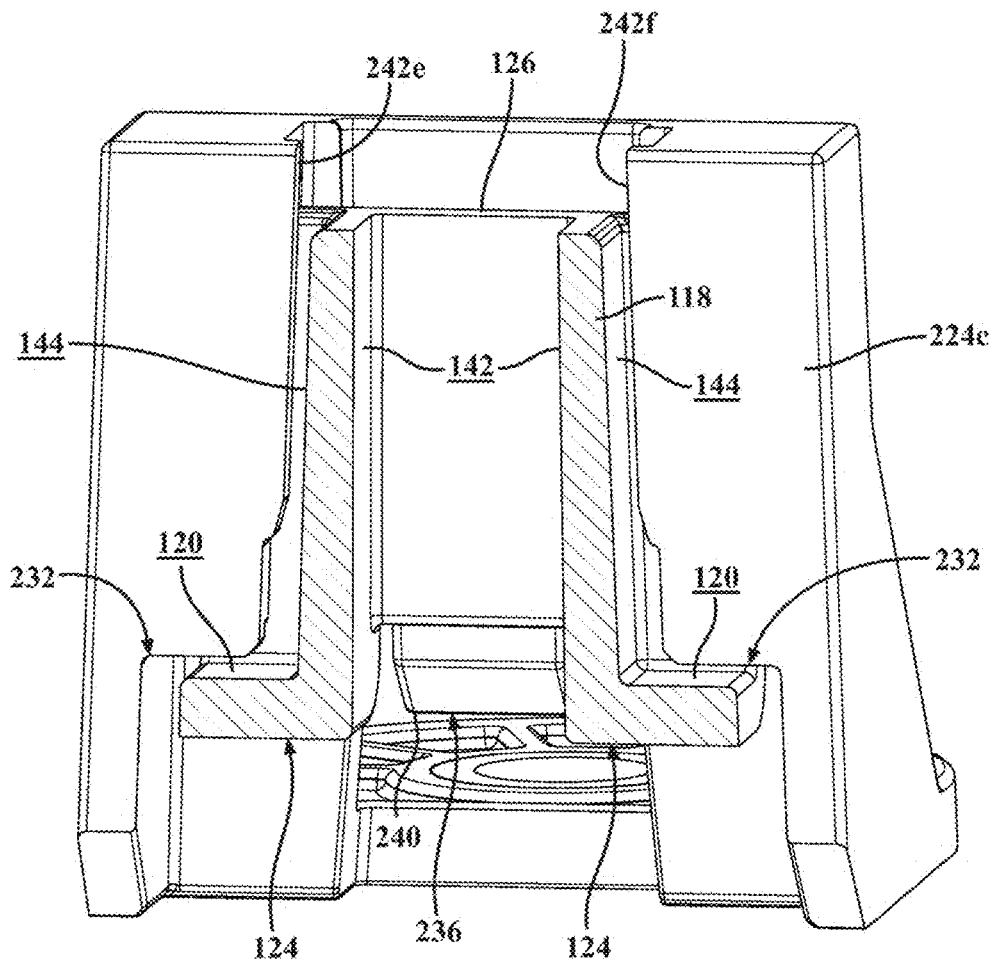
FIG. 7 is a cross-sectional view of the attachment system taken along line 7-7 of FIG. 2B.

As shown in FIGS. 2B, 3A, and 7, the pair of rails 118 of the attachment mount 110 extend continuously between the main body 102 and the outer face 116 of the attachment mount 110. In particular, each rail 118 is integrally formed with and extends from the perimeter wall 108 of the main body 102 to the inner surface 120 of the second segment 126 of the outer face 116 and from the inner surface 120 of the first segment 124 of the outer face 116 disposed at the bottom end 114 of the attachment body 110 to the open top end 112 of the attachment body 110. As shown, each rail 118 is defined by an inner surface 142 and an outer surface 144 disposed on an opposite side of the rail 118 than the inner surface 142. As shown, the pair of rails 118 are parallel to and spaced apart from one another such that the respective inner surfaces 142 of each rail 118 face one another while the respective outer surfaces 144 of each rail 118 face away from one another. The pair of rails 118 further defines a gap 146 extending between the inner surfaces 142 of the rails 118 and between the inner surface 120 of the outer face 116 and the perimeter wall 108 of the main body 102. The gap 146 generally aligns with the cutout 140) formed in the second segment 126 of the outer face 116. As such, the cutout 140 is generally disposed between the pair of rails 118.

Referring to FIGS. 4A-4D, the interchangeable attachment leg 200 (also referred to as an attachment leg 200) is defined by a top end 202, a bottom end 204 formed on an opposite end of the interchangeable attachment leg 200 than the top end 202, a front end 206, and a back end 208 disposed on an opposite side of the interchangeable attachment leg 200 than the front end 206. As shown, the interchangeable attachment leg 200 generally forms an L-shaped bracket and includes a vertical body 210 extending from the top end 202 to the bottom end 204 at the back end 208, and a flange 212 extending from the vertical body 210 to the front end 206. The flange 212 is centrally aligned with the vertical body 210, may be generally semi-circular, and includes an aperture 214 configured to receive a fastener (e.g., a screw, bolt, or snap) 14 (FIGS. 9 and 10) for affixing the attachment system 10 to a vehicle body 12 or other environment.

Figures 4A, 4B:
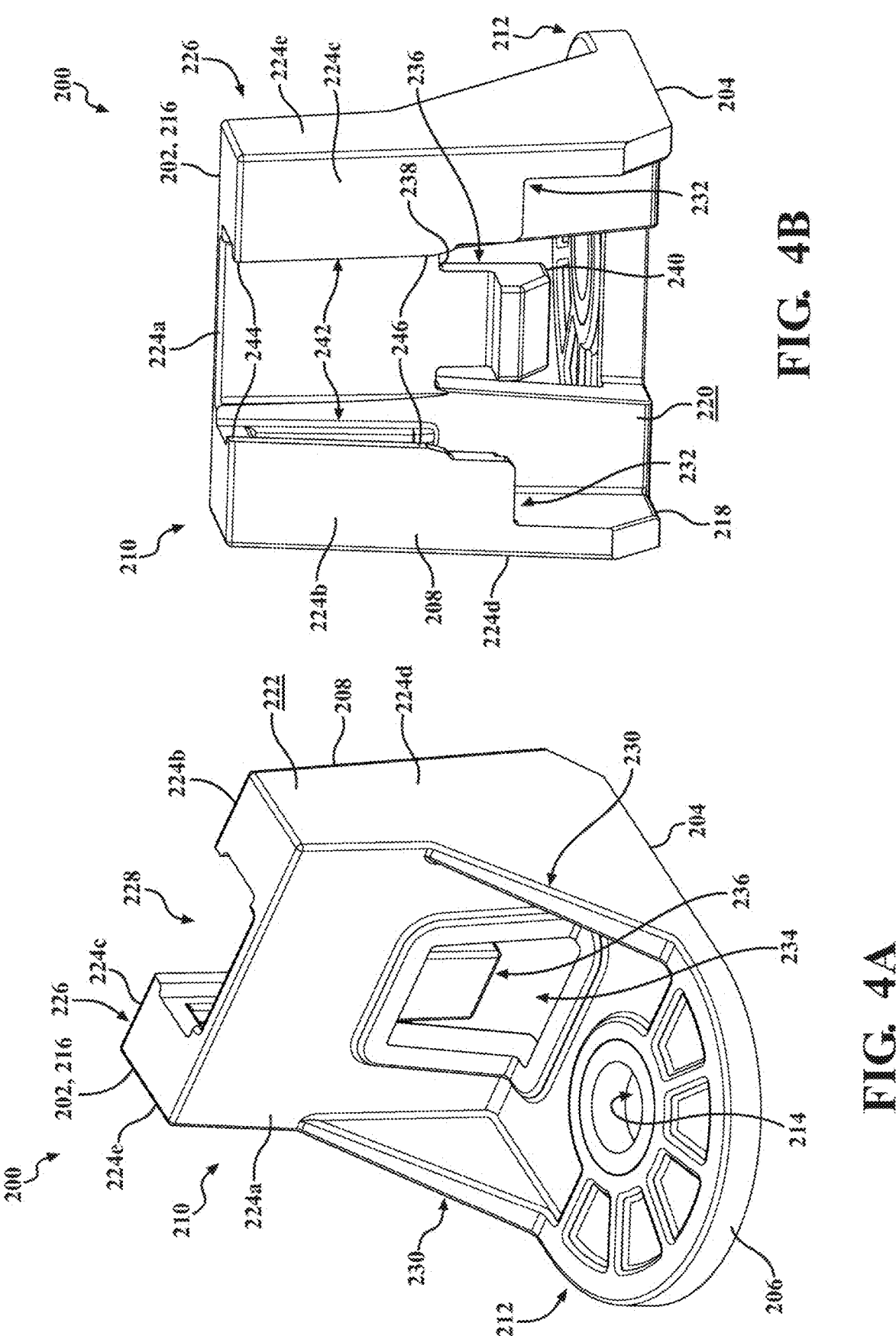
FIG. 4A is a side perspective view of an interchangeable attachment leg of the attachment system of FIG. 1.
FIG. 4B is a rear perspective view of the interchangeable attachment leg of the attachment system of FIG. 1.

The vertical body 210 of the interchangeable attachment leg 200 extends from a closed first end 216 disposed at the top end 202 of the attachment leg 200 to an open second end 218 disposed at the bottom end 204 of the attachment leg 200. The vertical body 210 may further be defined by an inner surface 220 and an outer surface 222 formed on an opposite side of the vertical body 210 than the inner surface 220. The vertical body 210 may include one or more sidewalls 224, 224a-224e that collectively define a frame 226 surrounding a cavity 228. As shown, the sidewalls 224a-224e include a front sidewall 224a integrally formed with the flange 212, a pair of inner sidewalls 224b, 224c formed on an opposite side of the vertical body 210 than the front sidewall 224a, and outer sidewalls 224d, 224e extending between the front sidewall 224 and the respective inner sidewalls 224b, 224c. As shown in FIG. 4A, the outer sidewalls 224d, 224e may include respective supports 230 that extend beyond the front sidewall 224a. For example, the supports 230 connect the front sidewall 224a to the flange 212 and taper continuously in height from the front sidewall 224a to the flange 212.

With continued reference to FIGS. 4A-4D, the sidewalls 224a-224e may include varying heights. For example, the front sidewall 224a and the outer sidewalls 224d, 224e may extend continuously from respective first ends disposed at the top end 216 of the vertical body 210 to respective second ends disposed at the bottom end 218 of the vertical body 210, while the inner sidewalls 224b, 224c may extend from respective first ends disposed at the top end 216 of the vertical body 210 to respective second ends spaced apart from the bottom end 218 of the vertical body 210. As best shown in FIG. 4B, each inner wall 224b, 224c cooperates with a respective outer wall 224d, 224e to form a step 232. As will be described in further detail below; the step 232 is configured to engage the first segment 124 of the outer face 116 of the attachment mount 210 when the attachment leg 200 is seated on the attachment mount 110.

The interchangeable attachment leg 200 may further include a window 234 formed through a thickness of the vertical body 210 from the inner surface 220 to the outer surface 222. The window 234 is located in the front sidewall 224a and is spaced centrally between the outer sidewalls 224d, 224e. As shown, the window 234 extends from the open bottom end 218 of the vertical body 210 inward toward the closed top end 216 of the vertical body 210. The front sidewall 224a further includes a catch 236 that extends into the window 234 from a first end 238 integrally formed with the front sidewall 224a to a terminal end 240 having a trapezoidal profile configured to engage the cutout 140 in the attachment mount 110 of the module 100. As discussed below, the catch 236 is operable between an engaged first position in a resting state and a disengaged second position in a biased state. Particularly, the catch 236 may be moved to the first position to engage the terminal end 240 with the cutout 140 and to the second position to disengage the terminal end 240 from the cutout 140.

Referring to FIGS. 4A-7, the frame 226 of the vertical body 210 of the attachment leg 200 may further include one or more tuning ribs 242, 242a-242f formed on the sidewalls 224 of the vertical body 210. Each tuning rib 242 extends from a first end 244 disposed at the top end 216 of the vertical body 210 towards a second end 246 spaced away from the open bottom end 218 of the vertical body 210. Each tuning rib 242 may include a continuous taper along its height as it extends from the first end 244 toward the second end 246. As shown, the respective second ends of the inner sidewalls 224b, 224c may be closer to the open bottom end 218 of the vertical body 210 than the second end 246 of each tuning rib 242. Put another way, the respective steps 232 formed by the inner sidewalls 224b, 224c cooperating with respective outer sidewalls 224d, 224e are disposed closer to the open bottom end 218 of the vertical body 210.

Figures 4C, 4D:
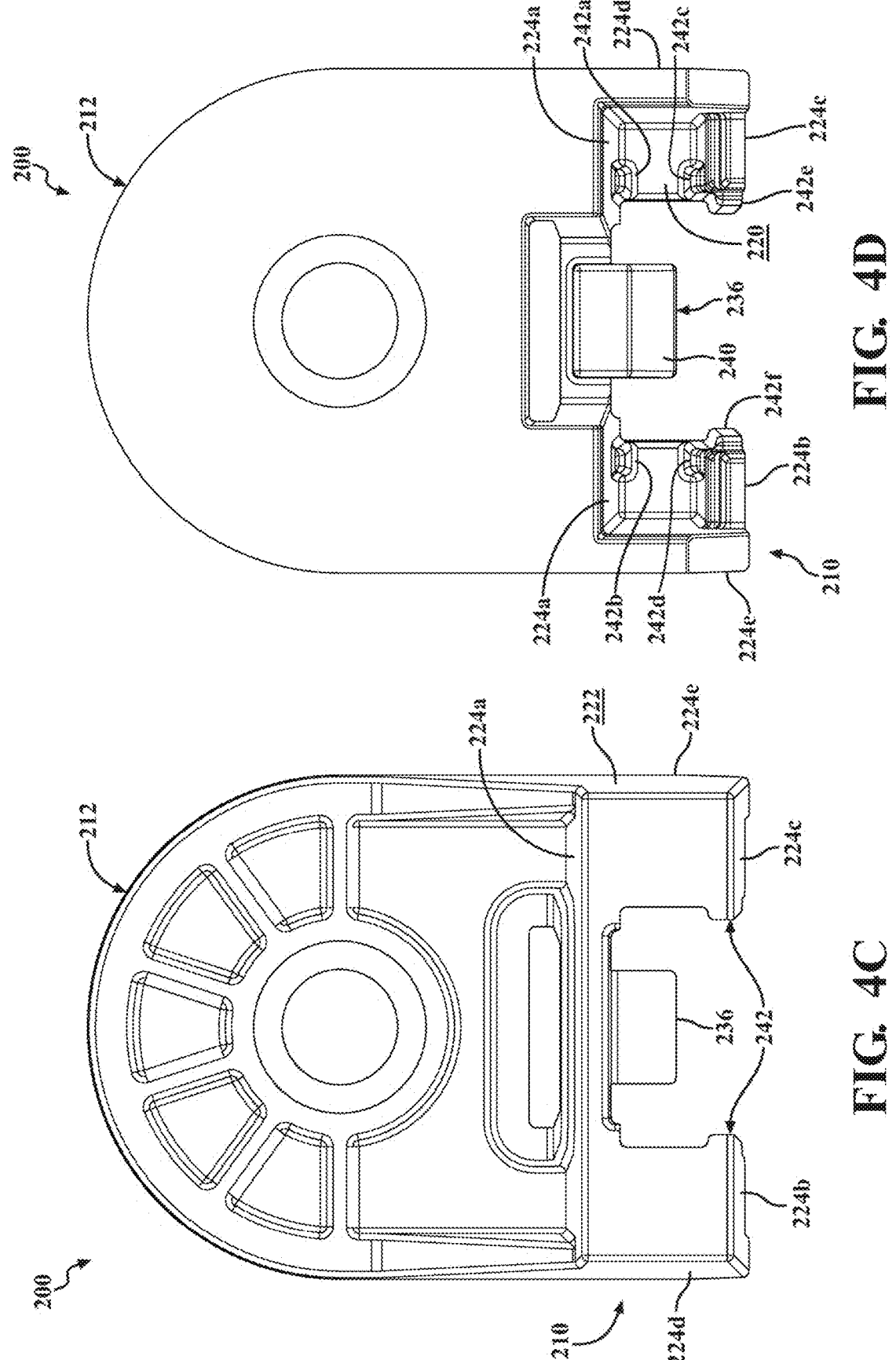
FIG. 4C is a top plan view of the interchangeable attachment leg of the attachment system of FIG. 1.
FIG. 4D is a bottom plan view of the interchangeable attachment leg of the attachment system of FIG. 1.
Figure 5A:
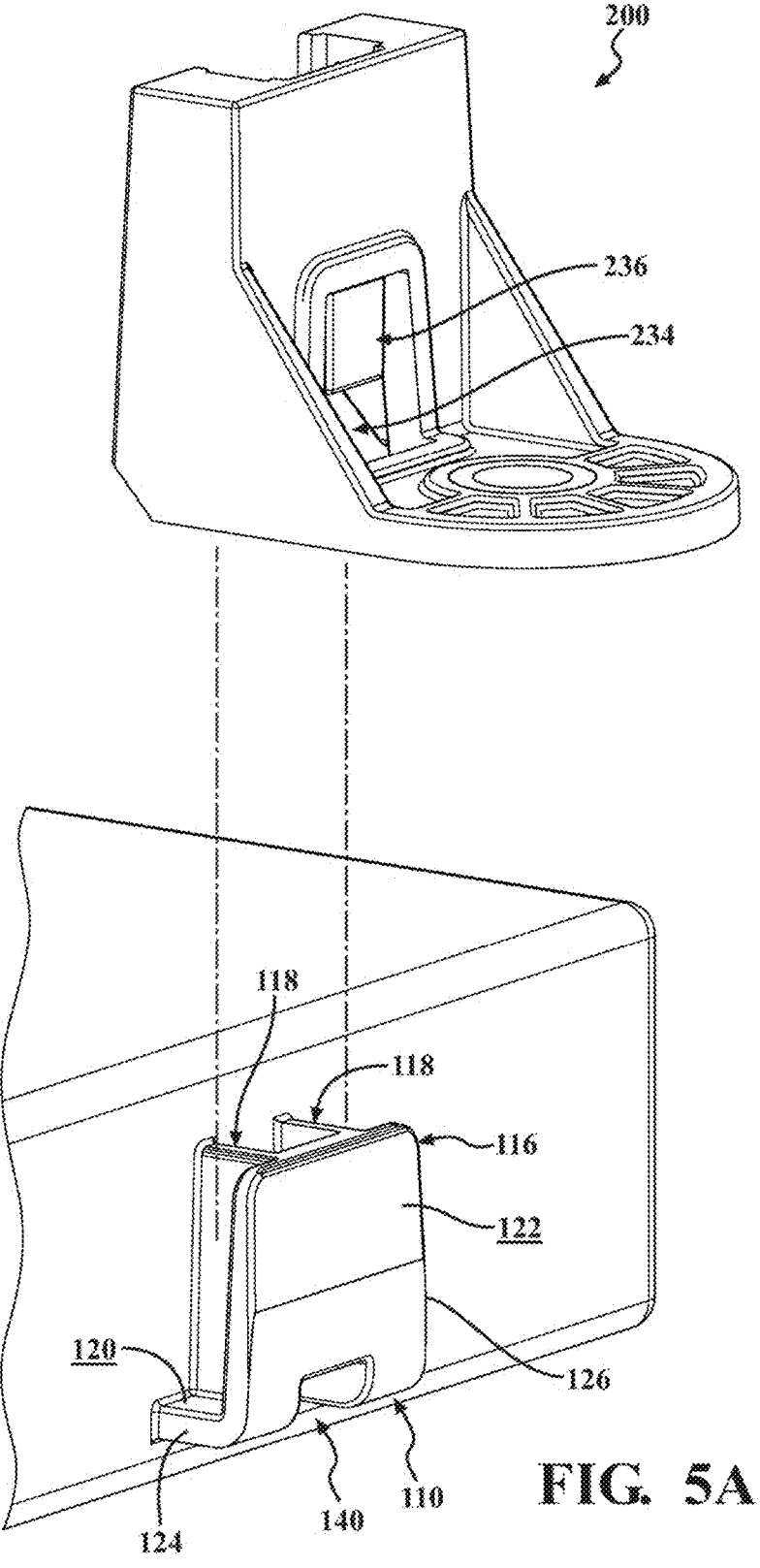
FIG. 5A is an exploded front perspective view of the attachment system of FIG. 1.
Figure 5B:
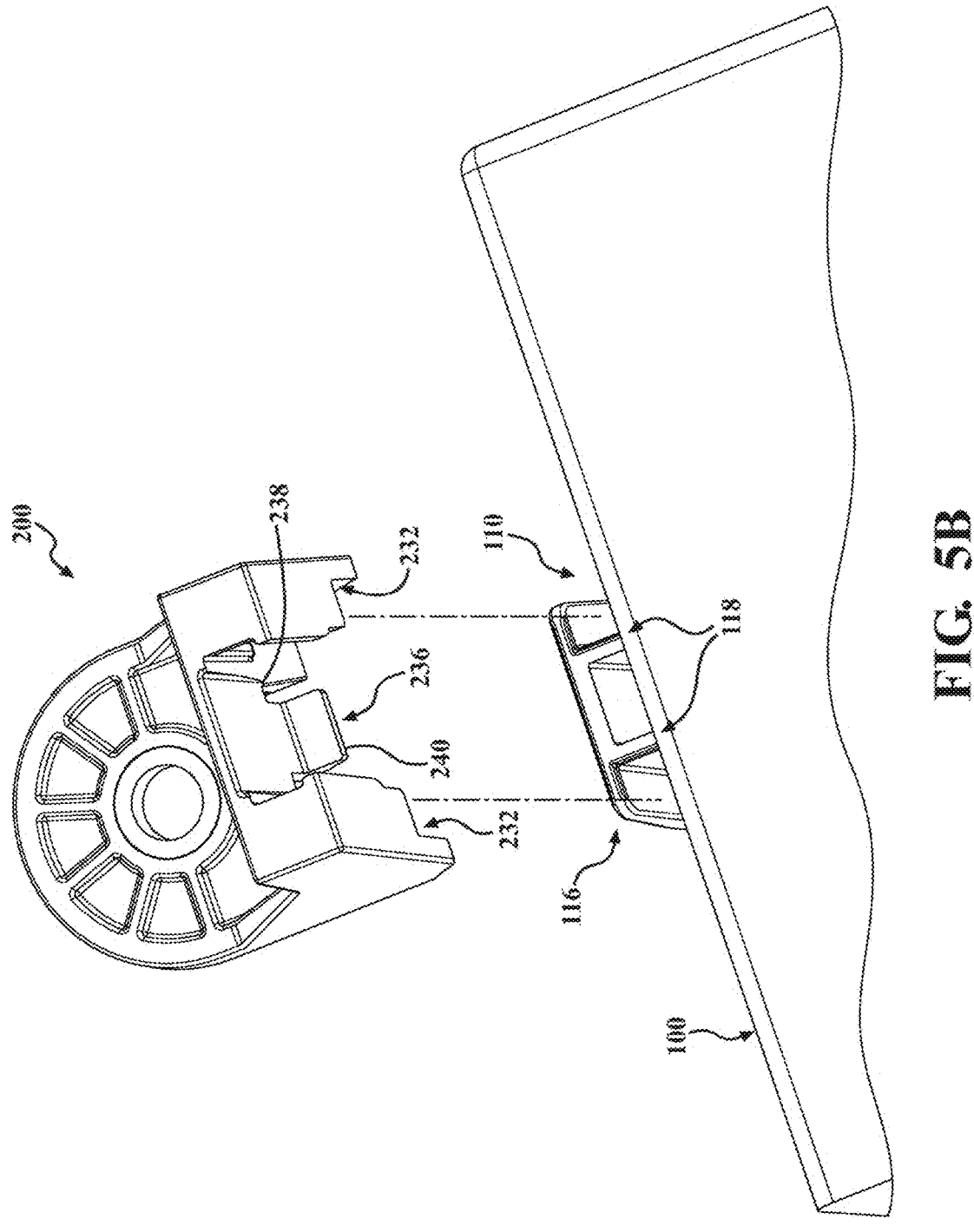
FIG. 5B is an exploded rear perspective view of the attachment system of FIG. 1.

As best shown in FIGS. 4D and 6, front tuning ribs 242a, 242b are disposed on the inner surface 222 of the vertical body 210 on the front sidewall 224a on either side of the window 234. Similarly, rear tuning ribs 242c, 242d are disposed on the inner surface 222 of the vertical body 210 on respective inner sidewalls 224b, 224c. As best shown in FIGS. 4B and 7, inner tuning ribs 242e, 242f are disposed on an interior edge of respective inner sidewalls 224b, 224c. In particular, the inner tuning ribs 242e, 242f are formed between the inner surface 220 of the vertical body 210 and the outer surface 222 of the vertical body 210, such that the inner tuning ribs 242e, 242f extend the length of the respective inner sidewalls 224b, 224c.

Referring now to FIGS. 2A-7, the attachment system 10 may be assembled in preparation for mounting the module 100 to a vehicle floor bed 12. The interchangeable attachment leg 200 may be inserted onto the attachment mount 110 via a user aligning the frame 226 of the attachment leg 200 with the rails 118 of the attachment mount 110 and sliding the frame 226 along the rails 118. In so doing, the user exerts a force on the attachment leg 200 such that the outer surface 122 of the outer face 116 biases the terminal end 240 of the catch 236 into the second position until the step 232 seats on the first segment 124 of the outer face 116 and the catch 236 moves or snaps into place in the cutout 140 of the attachment mount 110. The terminal end 240 of the catch 236 may spring back into the first position when the catch 240 is positioned within the cutout 140 such that the terminal end 240 engages the outer face 116 to maintain the attachment leg 200 within the cutout 140.

Similarly, as the user slides the frame 226 along the rails 118, the tapered tuning ribs 242 of the frame 226 engage the outer face 116 and the rails 118 of the attachment mount 110 in a pinch fit. Here, the clearance between each tuning tapered tuning rib 242 and its respective surface of the attachment mount 110 may be 1 millimeter (mm). Notably, when the attachment leg 200 is fully seated on the attachment mount 110, the attachment system 10 has points of contact in all three dimensions applying opposing forces, thereby preventing any moving, shifting, or manipulation of the module 100 while in use (e.g., due to vibrations of a motor vehicle in operation). Specifically, the force generated by the catch 236 being received into the cutout 140 opposes the force generated by the step 232 seated on the first segment 124 of the outer face 116. Further, the tuning ribs 242a, 242b apply a force on the outer surface 122 of the outer face 116, which opposes the force of the tuning ribs 242c, 242d applying a force on the inner surface 124 of the outer face 116. Further yet, the tuning ribs 242d apply opposing forces on the outer surfaces 144 of the respective rails 118. After the attachment leg 200 is fully seated on the attachment mount 110, the user may use fasteners sized for the respective apertures 212 to fix the module 100 to a vehicle floor bed 12 or other suitable location.

Figures 8A, 8B, 8C:
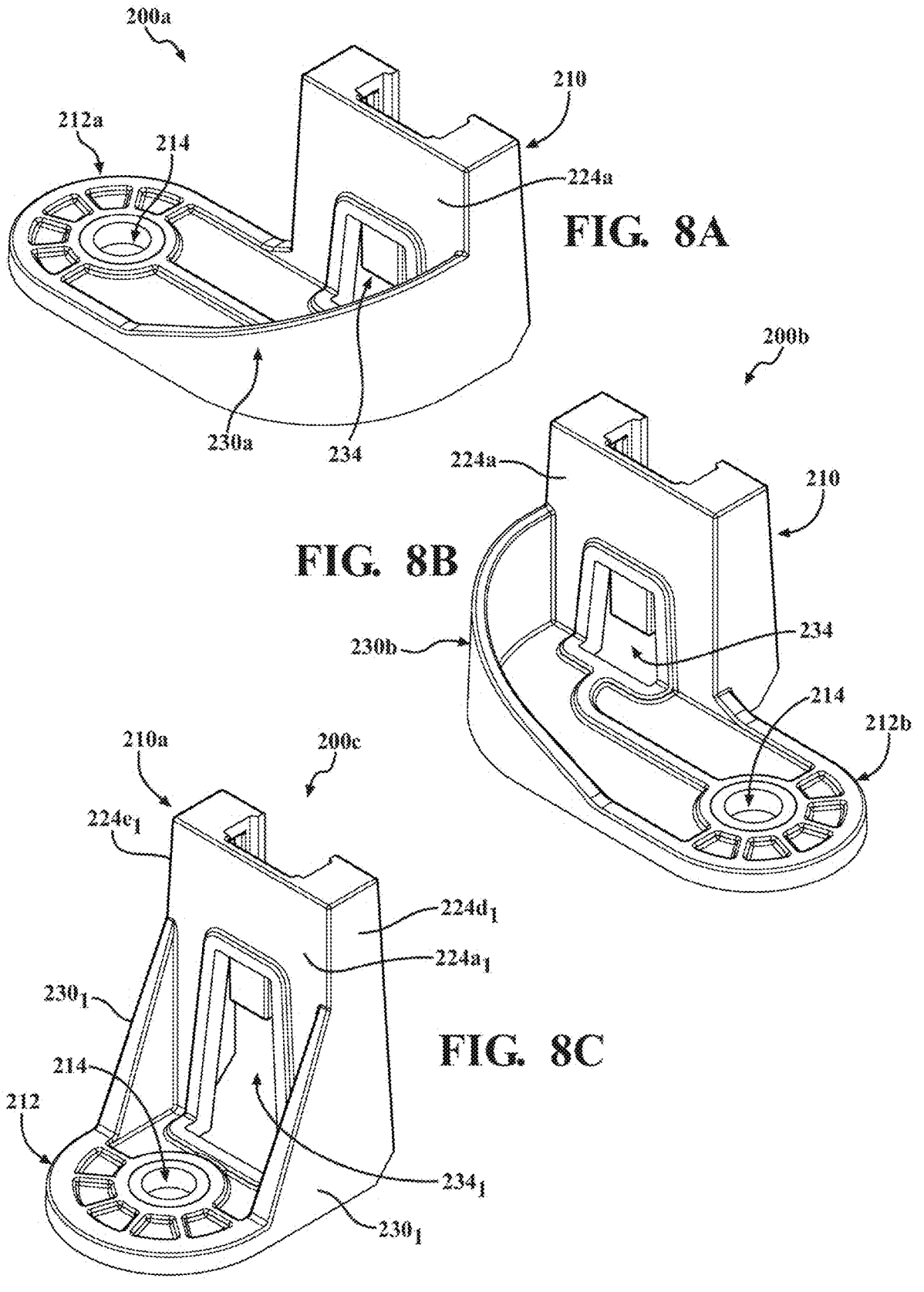
FIGS. 8A-8C show example interchangeable attachment legs for an attachment system according to the present disclosure.

FIGS. 8A-8C illustrate various features of the interchangeable attachment legs 200a-200c. As discussed above, the attachment legs 200a-200c include respective flanges 212, 212a. 212b extending from a respective vertical body 210, 210a. Each flange 212, 212a, 212b may include a generally semi-circular segment and may further include an aperture 214 configured to receive a fastener (e.g., a screw, bolt, or snap) for affixing the attachment system 10 to a vehicle body 12 or other environment. Due to the dimensional constraints associated with mounting modules 100 to a vehicle body 12, the shape of the attachment legs 200 and respective flanges 212 will impact which planes and angles to which the modules 100 can be affixed/mounted.

For example. FIG. 8A shows an interchangeable attachment leg 200a that includes an extended left-hand flange 212a. In particular, the aperture 214 of the flange 212a is aligned to the left of the window 234 of the front sidewall 224a. Additionally, the attachment leg 200a only includes a single support 230a extending arcuately from the vertical body 210 to the flange 212a. Similarly. FIG. 8B shows an interchangeable attachment leg 200b that includes an extended right-hand flange 212b. Like the aperture 214 of the flange 212a, the aperture 214 in the flange 212b is misaligned with the window 234 of the front sidewall 224a.

However, in this instance, the aperture 214 of the flange 212b is located to the right of the attachment leg 200b. Moreover, the attachment leg 200b includes a single support leg 230b extending arcuately from the vertical body 210 to the flange 212b. The interchangeable attachment legs 200a, 200b allow for a module 100 to be mounted to a vehicle floor bed 12 where the mounting surface is offset from the attachment mounts 110 and/or is spaced away from the module 100.

Alternatively, as shown in FIG. 8C, an interchangeable attachment leg 200c may include an extended vertical body 210a. Here, the interchangeable attachment leg 200c includes a centrally aligned flange 212, but the height of the vertical body 210a is higher than the vertical body 210 of the interchangeable attachment leg 200. Notably, the additional height of the vertical body 210a extends from the open bottom end 218, thereby extending the height of the sidewalls $224a_1$, $224d_1$, $224e_1$, the supports $230_1$, and the window $234_1$, while the dimensions of the sidewalls 224b, 22bc, the tuning ribs 242, and the catch 236 remain the same. Here, the interchangeable attachment leg 200c allows for a module 100 to be mounted to a vehicle floor bed 12 that is not on the same plane as the module 100.

Figure 9:
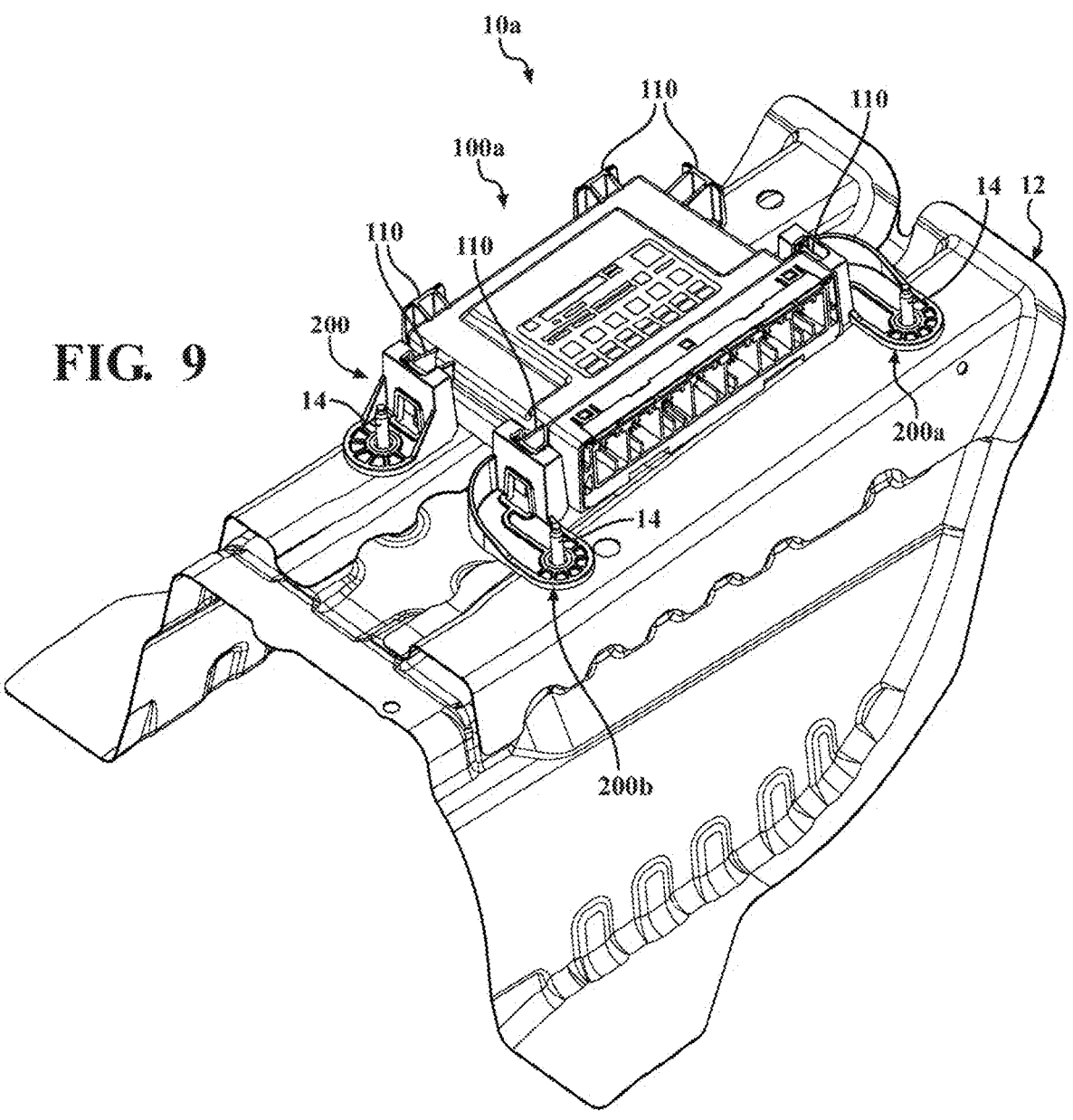
FIG. 9 is a side perspective view of an attachment system in an automotive environment according to the present disclosure.
Figure 10:
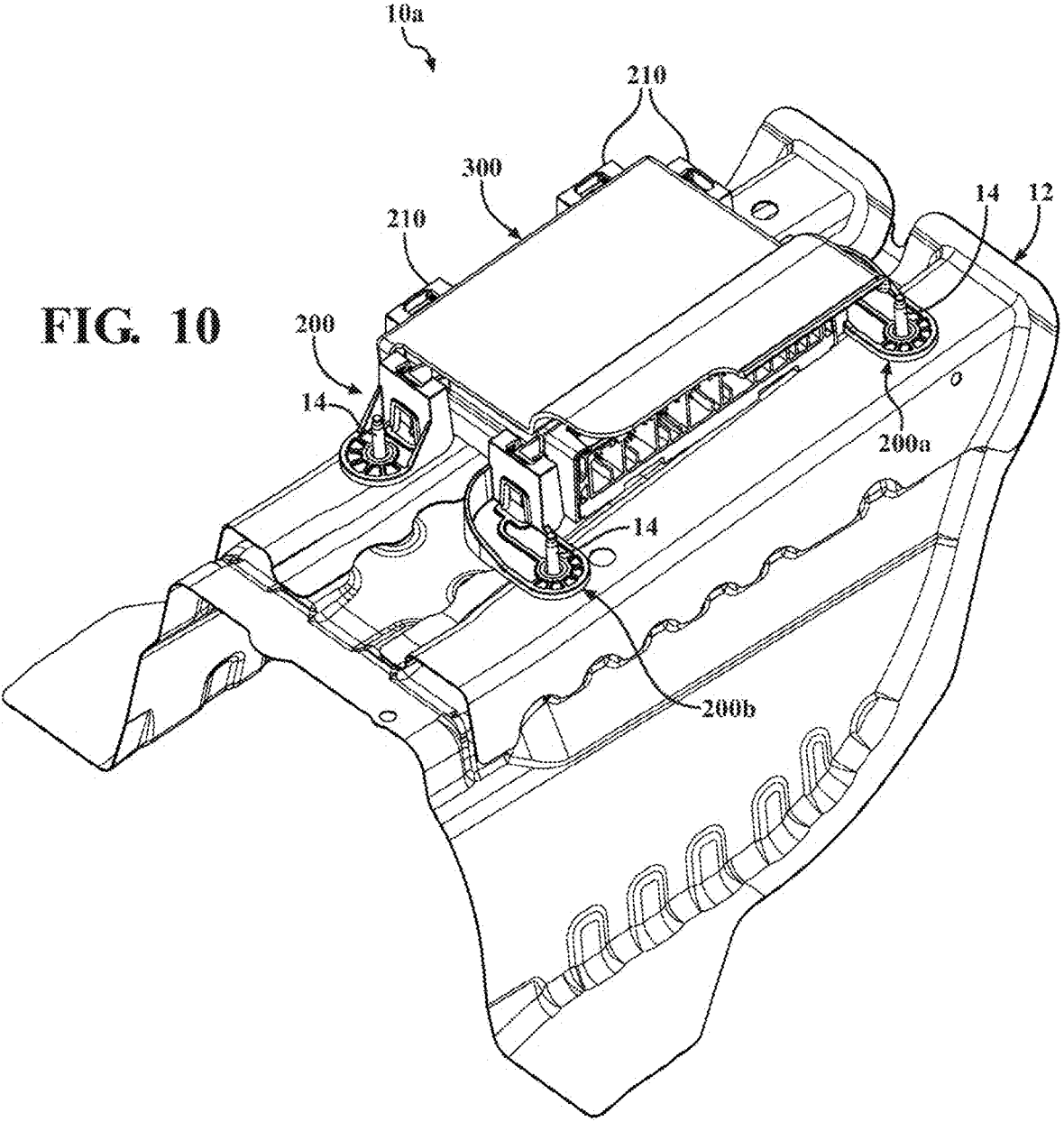
FIG. 10 is a side perspective view of the attachment system of FIG. 9 including a water cover attached utilizing attachment mounts of the attachment system.

With particular reference to FIGS. 9 and 10, an attachment system 10a is provided and includes a module 100a and a plurality of interchangeable attachment legs 200, 200a, 200b. In view of the substantial similarity in structure and function of the components associated with the attachment system 10a with respect to the attachment system 10, like reference numerals are used hereinafter and in the drawings to identify like components while like reference numerals containing letter extensions are used to identify those components that have been modified.

As shown in FIG. 9, the module 100a of the attachment system 10a includes six (6) attachment mounts 110, and three (3) interchangeable attachment legs 200, 200a, 200b. As such, three (3) of the attachment mounts 110 are exposed and not used. Here, the unused attachment mounts 110 may provide an attachment interface for additional components of the module. For example, as shown in FIG. 10, the module 100a may include a water shield 300 that is affixed to the remaining attachment mounts 110. The water shield 300 may incorporate three (3) vertical bodies 210 to engage with the remaining attachment mounts 110. In other words, the attachment mounts 110 may be universal while providing the ability for versatile fixturing such as incorporating the vertical bodies 210 of the interchangeable attachment legs 200 into additional components rather than with the flanges 212.

Figures 11, 12:
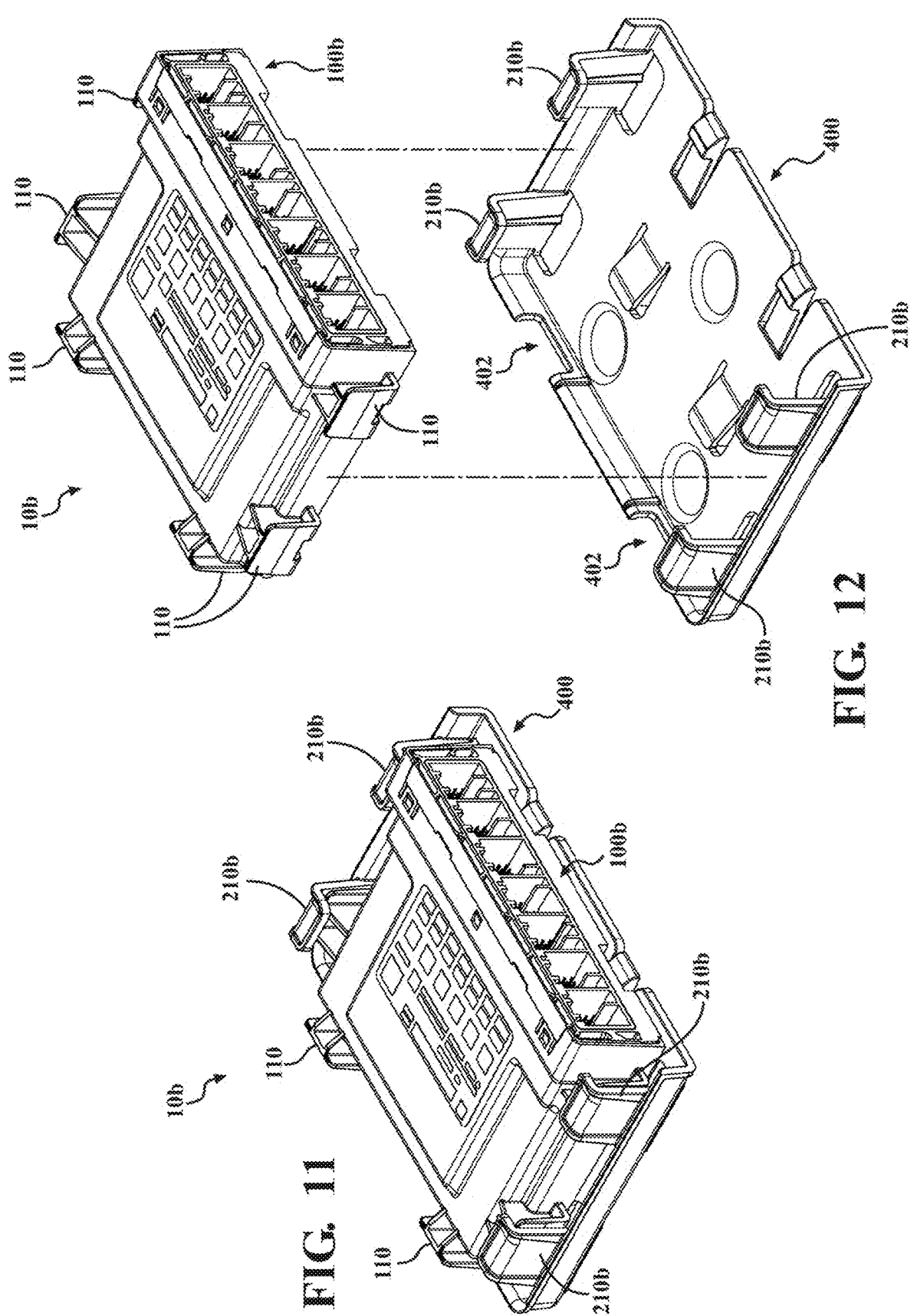
FIG. 11 is a side perspective view of an attachment system according to the present disclosure.
FIG. 12 is an exploded side perspective view of the attachment system of FIG. 11.

With particular reference to FIGS. 11 and 12, an attachment system 10b is provided and includes a module 100b and a custom bracket 400. In view of the substantial similarity in structure and function of the components associated with the attachment system 10b with respect to the attachment system 10, like reference numerals are used hereinafter and in the drawings to identify like components while like reference numerals containing letter extensions are used to identify those components that have been modified.

As shown in FIG. 12, the module 100b of the attachment system 10b includes six (6) attachment mounts 110. Here, rather than provide individual interchangeable attachment legs 200, the attachment system 10b includes the custom bracket 400 designed to interface with the attachment mounts 110 of the module 100b. Here, the custom bracket 400 includes four (4) vertical bodies 210b configured to selectively engage four (4) respective attachment mounts 110, and two (2) notches 402 sized to accommodate the remaining two (2) respective attachment mounts 110. As should be appreciated, the low profile of the attachment mounts 110 allows for simple custom bracketing.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. An interchangeable attachment system for a vehicle module, the system comprising:

a module having a body defined by a top surface, a bottom surface, and a perimeter wall extending around the body and from the top surface of the body to the bottom surface of the body, and an attachment mount disposed on the perimeter wall of the body and including an outer face extending from the perimeter wall and a pair of rails, the pair of rails extending between the outer face and the perimeter wall; and an interchangeable attachment leg including a vertical body having one or more sidewalls defining a frame, the frame sized to receive the attachment mount and slidably engage the pair of rails of the attachment mount, and including one or more tuning ribs disposed on an inner surface of the frame.

2. The system of claim 1, wherein the outer face includes a cutout.

3. The system of claim 2, wherein the vertical body further includes a catch, the catch selectively engaged with the cutout of the outer face.

4. The system of claim 1, wherein at least one of the one or more tuning ribs engages the pair of rails of the attachment mount.

5. The system of claim 1, wherein at least one of the one or more tuning ribs engages the outer face of the attachment mount.

6. The system of claim 1, wherein the one or more tuning ribs engage the pair of rails of the attachment mount and the outer face of the attachment mount.

7. The system of claim 1, wherein the one or more sidewalls of the frame include an interior sidewall and an outer sidewall, the interior sidewall of the frame and the outer sidewall of the frame defining a step.

8. The system of claim 7, wherein the step engages a first segment of the outer face of the attachment mount.

9. The system of claim 8, wherein the interchangeable attachment leg further includes a flange extending from the vertical body.

10. An interchangeable attachment system, the system comprising:

a module having a body defined by a top surface, a bottom surface, and a perimeter wall extending around the body and from the top surface of the body to the bottom surface of the body, and an attachment mount disposed on the perimeter wall of the body, the attachment mount including an outer face extending from the perimeter wall and a pair of rails, the outer face including a cutout; and an interchangeable attachment leg, the interchangeable attachment leg including a vertical body having one or more sidewalls defining a frame and a catch, the frame sized to receive the attachment mount and slidably engage the pair of rails of the attachment mount, and including one or more tuning ribs disposed on an inner surface of the frame, the catch selectively engaged with the cutout of the outer face.

11. The system of claim 10, wherein the pair of rails extend between the outer face and the perimeter wall.

12. The system of claim 11, wherein the cutout of the outer face is disposed between the pair of rails.

13. The system of claim 11, wherein at least one of the one or more tuning ribs engages the pair of rails of the attachment mount.

14. The system of claim 11, wherein at least one of the one or more tuning ribs engages the outer face of the attachment mount.

15. The system of claim 11, wherein the one or more tuning ribs engage the pair of rails of the attachment mount and the outer face of the attachment mount.

16. The system of claim 10, wherein the one or more sidewalls of the frame include an interior sidewall and an outer sidewall, the interior sidewall of the frame and the outer sidewall of the frame defining a step.

17. The system of claim 16, wherein the step engages a first segment of the outer face of the attachment mount.

18. The system of claim 17, wherein the interchangeable attachment leg further includes a flange extending from the vertical body.

19. An interchangeable attachment system for a vehicle module, the system comprising:

a module having a body defined by a top surface, a bottom surface, and a perimeter wall extending around the body and from the top surface of the body to the bottom surface of the body, and an attachment mount disposed on the perimeter wall of the body and including an outer face extending from the perimeter wall and a pair of rails, the pair of rails extending between the outer face and the perimeter wall; and an interchangeable attachment leg including a vertical body having one or more sidewalls defining a frame, the frame sized to receive the attachment mount and slidably engage the pair of rails of the attachment mount, the one or more sidewalls of the frame including an interior sidewall and an outer sidewall, the interior sidewall of the frame and the outer sidewall of the frame defining a step.

20. The system of claim 19, wherein the outer face includes a cutout.

* * * * *